No. 865,856.　　　　　　　　　　　PATENTED SEPT. 10, 1907.
C. S. BLAIN.
STATIONARY WASHSTAND.
APPLICATION FILED JAN. 31, 1907.
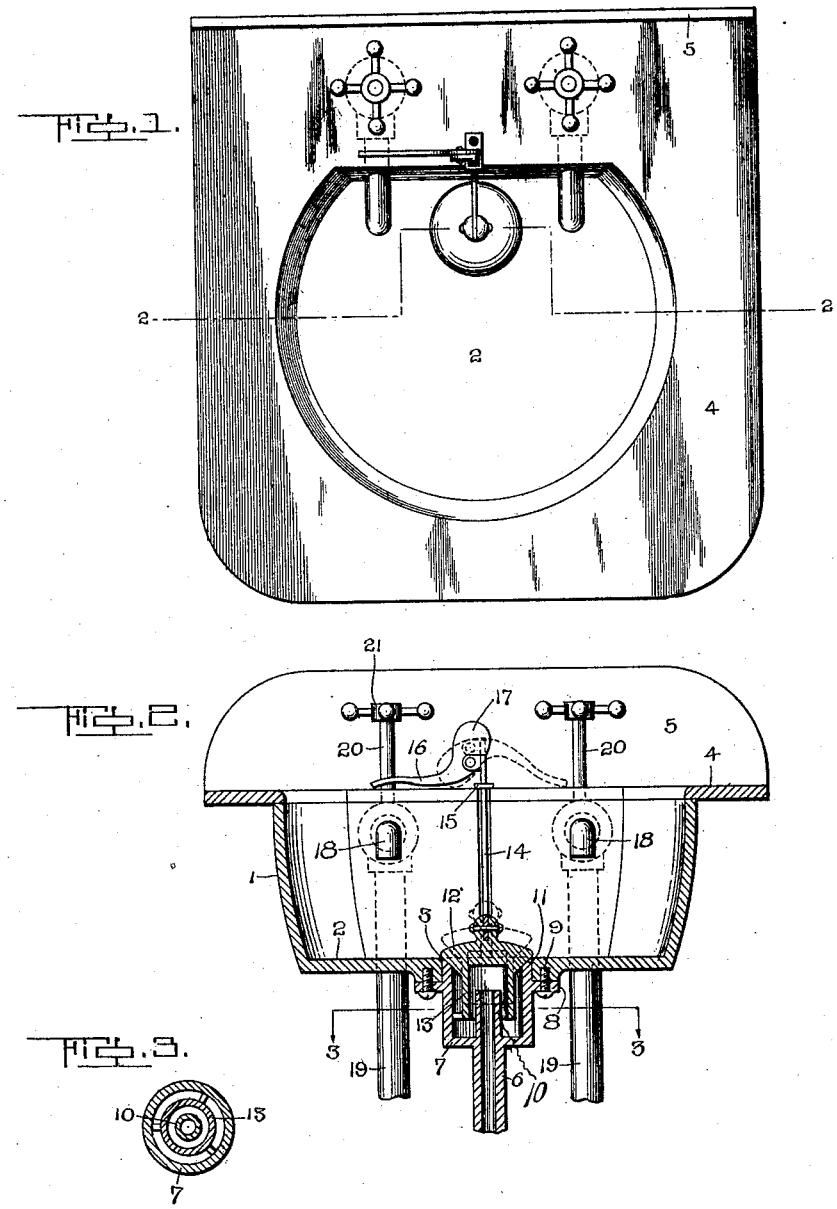
Inventor
Charles S. Blain,
Witnesses
By Victor J. Evans
Attorney

UNITED STATES PATENT OFFICE.

CHARLES S. BLAIN, OF SEATTLE, WASHINGTON.

STATIONARY WASHSTAND.

No. 865,856.         Specification of Letters Patent.         Patented Sept. 10, 1907.

Application filed January 31, 1907. Serial No. 355,175.

*To all whom it may concern:*

Be it known that I, CHARLES S. BLAIN, a citizen of the United States, residing at Seattle, in the county of King and State of Washington, have invented new and useful Improvements in Stationary Washstands, of which the following is a specification.

This invention relates to stationary washstands and embodies a vessel or bowl having a discharge pipe leading therefrom, together with inlet pipes equipped with valve controlled faucets entered through one wall of the bowl for supplying water to the latter.

The invention has for its objects to provide a comparatively simple, inexpensive device of this character wherein the faucets will occupy an unobstructing position, one in which the discharge pipe is provided with an improved form of trap which will effectually seal the pipe and prevent the entrance of foreign matters into the latter, and one wherein the trap may be conveniently cleaned when circumstances require.

A further object of the invention is to provide an improved form of valve for closing the mouth of the discharge pipe, together with a simple form of mechanism for operating the valve and locking the same in open position.

With these and other objects in view, the invention comprises the novel features of construction and combination of parts more fully hereinafter described.

In the accompanying drawings: Figure 1 is a top plan view of a stationary washstand embodying the invention. Fig. 2 is a vertical section taken on the line 2—2 of Fig. 1. Fig. 3 is a detail, horizontal section taken on the line 3—3 of Fig. 2.

Referring to the drawings, 1 designates the wash bowl or vessel having its bottom 2 provided with a discharge opening 3, said bowl being attached at its upper edge to a horizontal table 4 terminating at its rear edge in a vertical back plate 5. These parts, which may be of the usual or any appropriate construction and material, are adapted in practice to perform their ordinary functions.

Leading from the bowl 1 is a discharge pipe or duct 6 terminating at its upper end in an enlarged tubular portion or trap 7 having its upper end fitted in the opening 3 and provided at a point beneath said end with horizontal, perforated ears 8 adapted to receive fastening members or screws 9 engaged with the bottom 2 for attaching the pipe to the bowl, there being formed on the pipe a portion or extension 10 arranged centrally of and projecting upward into the trap 7, the upper edge of which is beveled to form a valve seat 11.

Arranged for closing the upper end of the pipe 6 is a valve 12 adapted when in closed position to rest on the seat and having a depending tubular portion 13 designed to extend downward into the trap 7 and receive the upper portion of the tubular extension 10, there being attached to the valve a vertically uprising rod or stem 14 arranged to work in a guide 15 and eccentrically pivoted at its upper end to an operating member or lever 16 having a cam portion or head 17 for a purpose which will presently appear.

Projected into the bowl 1 through the rear wall of the latter is a pair of faucets 18 fixed respectively on the upper ends of water supply pipes or ducts 19 and having suitable controlling valves, the stems 20 of which project upward through the table 4 and are equipped at their upper ends with hand pieces or wheels 21, it being noted in this connection that the faucets enter the bowl at a point beneath the table and are therefore concealed from view by the latter.

The water is supplied to the bowl in the usual manner through the faucets 18, the controlling valves of which are operated through the medium of the stems 20, it being noted in this connection that by arranging the faucets to enter the bowl at a point beneath the table 4 they will occupy a wholly unobstructing position. When it is desired to discharge the water from the bowl the valve 12, which stands in the position shown by full lines in Fig. 2 for closing the discharge opening 3, is, by turning the operating member 16 to the dotted line position shown in said figure, moved to open position, thereby allowing the water to pass off freely through the pipe 6, the valve being, under these conditions, retained in open condition through engagement of the cam head 16 with the table 4. In emptying the bowl any sediment or foreign matter which may be contained in the water will settle in the trap 7 and be prevented from entering the pipe 6 owing to the portion or extension 10 thereof projecting upward into the trap. By removing the valve, access may be had to the trap which may thus be readily cleaned. Owing to the provision of the extension 10 which projects into the trap, the latter is adapted at all times for holding a quantity of water beneath the level of which the lower end of the extension 13 projects, thereby forming a perfect seal for preventing escape of gases from the pipe 6.

Having thus fully described my invention, what I claim is:

In a device of the class described, a vessel or bowl having a discharge opening, a discharge pipe connected with said opening and terminating at its upper end in an enlarged portion or trap, said pipe being provided with a tubular portion or extension projected upward into the trap, a valve adapted to seat at the upper end of the latter for closing the discharge pipe, said valve having a depending tubular portion adapted to extend downward over the tubular extension, means for operating the valve, and means for supplying water to the bowl.

In testimony whereof, I affix my signature in presence of two witnesses.

CHARLES S. BLAIN.

Witnesses:
 C. E. VAN WEY,
 J. B. BROOKS.